United States Patent
Wang (10) Patent No.: US 9,187,147 B2
(45) Date of Patent: Nov. 17, 2015

(54) SYNCHRONOUSLY CONTROLLING DEVICE FOR A BICYCLE

(71) Applicant: Dongjun Wang, Shenzhen (CN)

(72) Inventor: Dongjun Wang, Shenzhen (CN)

(*) Notice: Subject to any disclaimer, the term of this patent is extended or adjusted under 35 U.S.C. 154(b) by 0 days.

(21) Appl. No.: 13/914,967

(22) Filed: Jun. 11, 2013

(65) Prior Publication Data
US 2014/0157950 A1 Jun. 12, 2014

Related U.S. Application Data

(63) Continuation-in-part of application No. 12/825,831, filed on Jun. 29, 2010, now Pat. No. 8,485,063, which is a continuation of application No. PCT/CN2008/073824, filed on Dec. 29, 2008.

(30) Foreign Application Priority Data

Dec. 29, 2007 (CN) .......................... 2007 1 0125631

(51) Int. Cl.
| | |
|---|---|
| *B62M 3/02* | (2006.01) |
| *B62M 3/08* | (2006.01) |
| *B62M 3/00* | (2006.01) |
| *B25B 27/00* | (2006.01) |
| *B62K 15/00* | (2006.01) |

(52) U.S. Cl.
CPC .............. *B62M 3/00* (2013.01); *B25B 27/0071* (2013.01); *B62M 3/08* (2013.01); *B62K 2015/003* (2013.01); *Y10T 74/2164* (2015.01); *Y10T 74/2165* (2015.01)

(58) Field of Classification Search
CPC ............ B62M 3/02; B62M 3/04; B62M 3/00; B62M 1/36
USPC ......... 74/594.1–594.7; 482/57; 280/259–261, 280/294, 297, 298
See application file for complete search history.

(56) References Cited

U.S. PATENT DOCUMENTS

| | | | | |
|---|---|---|---|---|
| 1,276,139 | A * | 8/1918 | Warren | 74/594.7 |
| 2,536,466 | A * | 1/1951 | Rippenbein | 74/594.7 |
| 3,422,701 | A * | 1/1969 | Boisis | 74/594.7 |
| 5,586,472 | A * | 12/1996 | Lin | 74/594.1 |
| 6,298,740 | B1 * | 10/2001 | Bridges | 74/594.2 |
| 2007/0261515 | A1 * | 11/2007 | Jones | 74/594.1 |

* cited by examiner

*Primary Examiner* — Daniel Yabut
(74) *Attorney, Agent, or Firm* — Dicke, Billig & Czaja, PLLC (57) ABSTRACT

The present invention is directed to a device for synchronously actuating at least two independent controlled apparatuses at two sides of the bottom bracket of the bicycle through a driving process. The independent controlled apparatuses can be foldable pedals or quick-disassembling pedals or foldable cranks.

3 Claims, 6 Drawing Sheets

SYNCHRONOUSLY CONTROLLING DEVICE FOR A BICYCLE

RELATED APPLICATION

This application is a continuation-in-part of U.S. patent Ser. No. 12/825,831 entitled "Device for Assembling/Disassembling Bicycle Pedals and Assembly for Controlling Assembling/Disassembling by One Step".

FIELD OF THE INVENTION

The present application relates to a device for controlling the components at two sides of the bottom bracket of a bicycle to actuate synchronously.

BACKGROUND OF THE INVENTION

Bicycle is one of the most popular means for transportation. Due to an increasing amount of bicycles and a bulky frame of each bicycle, more and more space is needed to place the bicycles. Specially, cranks and pedals rotationally connected to the bottom bracket of a bicycle bring unnecessary width demand when parked a bicycle. To decrease the width when parked a bicycle, bicycles with foldable pedals or quick-disassembling pedals or foldable cranks have appeared on the market.

Meanwhile, for the foldable pedals are arranged at two sides of the bicycle and in a relative lower position level, foldable pedals are not only smudging hands but also causing inconvenience during folding operation.

SUMMARY OF THE PRESENT INVENTION

The present invention is directed to a device for synchronously actuating at least two independent controlled apparatuses at two sides of the bottom bracket of the bicycle through a driving process. The independent controlled apparatuses can be foldable pedals or quick-disassembling pedals or foldable cranks.

Disclosed is a synchronously controlling device for a bicycle, comprising: a bottom bracket tube; two cranks, arranged at the two sides of the bottom bracket tube respectively; an actuating subassembly, arranged at the bottom bracket tube; two transmission subassemblies, arranged at the two sides of the actuating subassembly respectively; and two controlling rings, each controlling ring arranged between the actuating subassembly and one transmission subassembly so as to rotationally connect the actuating subassembly and the transmission subassembly; the trajectory of each controlling ring being parallel to the axis of the bottom bracket tube, the two transmission subassemblies being arranged on two cranks respectively and capable of rotating relative to the actuating subassembly, the driving action of the actuating subassembly being output synchronously from the transmission subassemblies at two sides of the actuating subassembly through the two controlling rings.

According to one embodiment of the present invention, the actuating subassembly comprises: a central control seat, a driving element and actuating rods, the central control seat is fixed to the bottom bracket tube, the driving element drives the actuating rod to move, the actuating rod is capable of directional moving axially along the bottom bracket tube; the transmission subassemblies comprise transmission fixing seats, transmission rods, the transmission fixing seat is fixed on the end of the crank, the transmission rod is capable of directional moving axially along the bottom bracket tube; the controlling ring is fixedly connected with one end of the corresponding transmission rod at the same side, or the controlling ring is fixedly connected with one end of the corresponding actuating rod at the same side, such that the driving action is conveyed via the transmission rods at the ends of the two cranks through the two controlling rings.

According to one embodiment of the present invention, the transmission subassembly further comprises a first retaining spring arranged between the transmission fixing seat and the transmission rod so as to retain the transmission rod at a predetermined position relative to the crank, the actuating subassembly further comprises a second spring between the actuating rod and the central control seat so as to retain the controlling ring at a predetermined position relative to the central control seat.

According to one embodiment of the present invention, the synchronously controlling device further comprising a first tube and a second tube, the driving element being formed as an actuating block, the first tube being fixed with the bottom bracket tube, the second tube being able to be folded relative to the first tube; a second connection point of the second tube being connected with a first connection point of the actuating block via a transmission wirerope; the actuating block of the actuating subassembly being operated by the actuating force generated during the second tube being folded to drive the actuating subassembly.

According to one embodiment of the present invention, the synchronously controlling device further comprising an actuating rack, the driving element being formed as a gear, the actuating rod being formed as a pushing rack, the gear being respectively engaged with the actuating rack and the two driving racks.

According to one embodiment of the present invention, the transmission rod is formed as a transmission rack, each controlling ring comprises an exterior ring and an interior ring capable of being relative rotation, and a transmission rack being fixed to the exterior ring; the actuating rod is formed as V-shaped rod, the hinge of the V-shaped rod is moveable, the two ends of the V-shaped rod are hinged to the interior ring of the two controlling rings.

According to one embodiment of the present invention, the synchronously controlling device further comprising a first tube, a second tube and an actuating gear, the first tube being fixed with the bottom bracket tube, the second tube being able to be folded relative to the first tube, the actuating gear being coaxially fixed to the foldable position between the first tube and the second tube, the actuating gear being engaged with the actuating rack, thus conveying the movement of the seat post to the actuating rack.

According to one embodiment of the present invention, the synchronously controlling device further comprising a driving transmission gear engaged with the transmission rack, the driving action of the actuating subassembly outputted by the transmission rack being conveyed by the driving transmission gear.

DETAILED DESCRIPTION

First Embodiment

Figure 1:
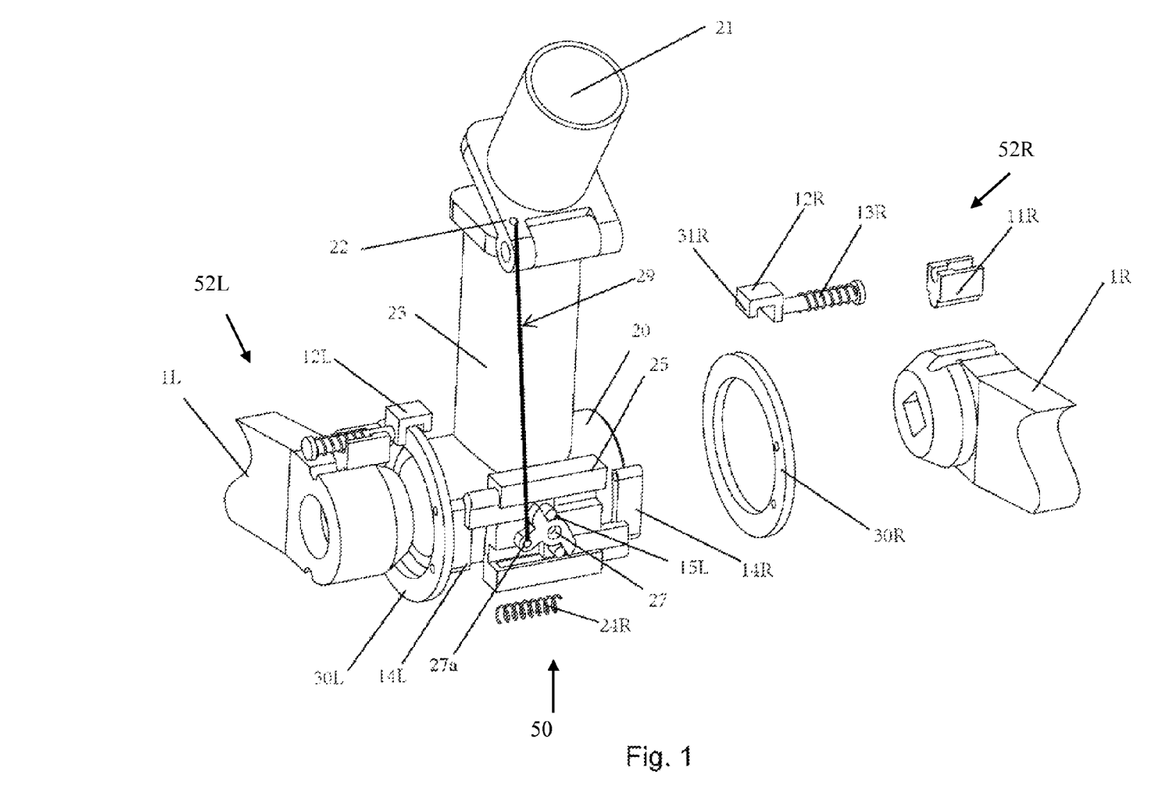
FIG. 1 is a partial perspective exploded view according to a first embodiment of the present application.
Figure 2:
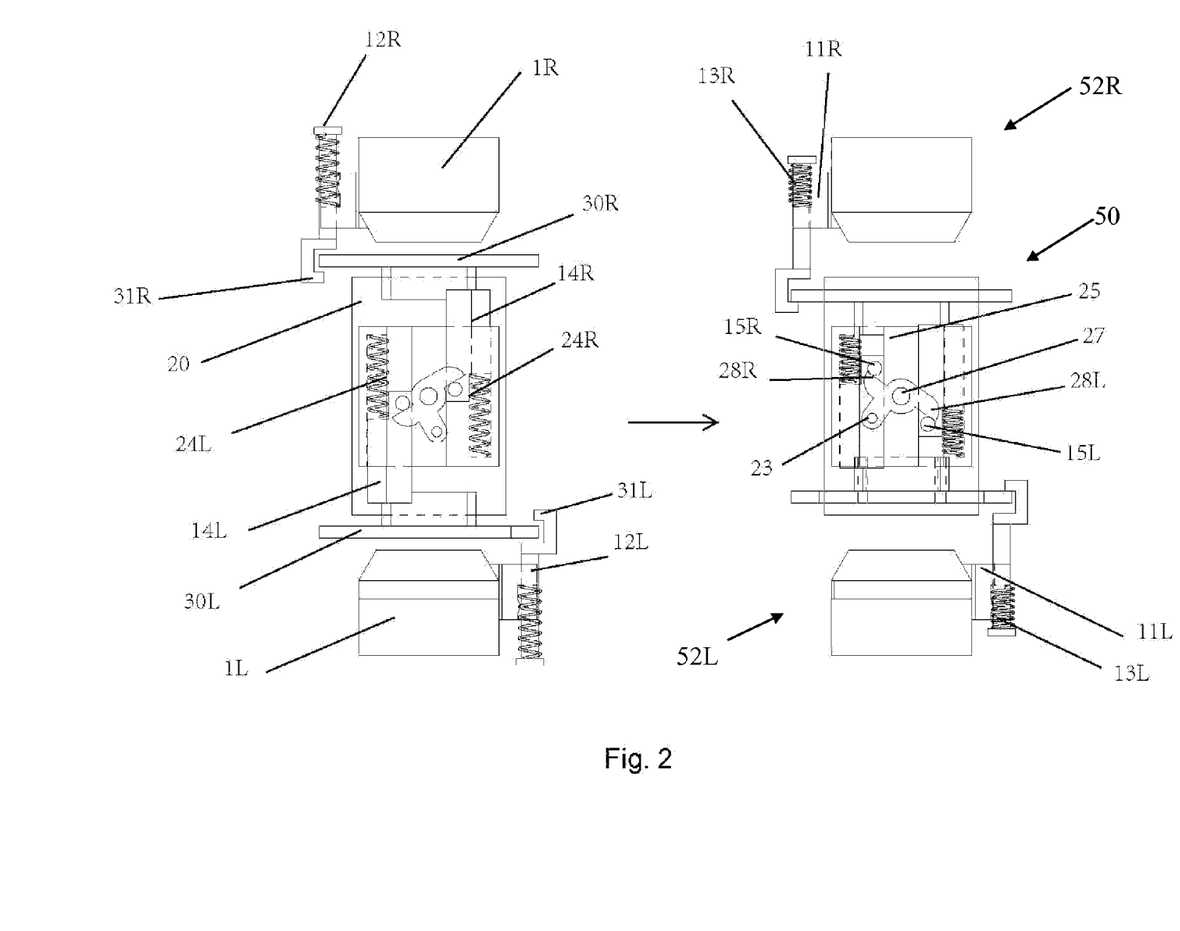
FIG. 2 is a schematic view showing a driving process according to the first embodiment of the present application.

As shown in FIG. 1 and FIG. 2, the two ends of the bottom bracket tube 20 of a bicycle are rotationally connected to two cranks 1R, 1L, each crank is provided with a transmission fixing seat 11R, 11L, each transmission fixing seat is provided with a transmission rod 12R, 12L capable of directional moving along the axis of the bottom bracket tube 20, a first retaining spring 13R, 13L is arranged between each transmission rod and the corresponding transmission fixing seat, wherein for each transmission rod 12R, 12L, one end thereof is extended to provide with a transmission protrusion 31R, 31L cooperated with a controlling ring 30R, 30L, and the other end thereof can be a gear transmission, or a transmission belt, or a transmission shaft and the like. The transmission fixing seat 11R, 11L and the transmission rod 12R, 12L define transmission subassemblies 52R, 52L.

A central control seat 25 is fixed on the bottom bracket tube 20 of a bicycle. Two actuating rods 14R, 14L are capable of directional sliding along the axial direction of the bottom bracket tube 20. The central control seat 25 is provided with a slideway for the two actuating rods to be slid on. For each actuating rod, one end thereof is fixed to a controlling ring 30R, 30L, and the other end thereof forms a circular pillar 15R, 15L. An actuating block 27 as a driving element is arranged on the central control seat 25 and can be spun axially. The central control seat 25, the actuating rods 14R, 14L and the actuating block 27 define an actuating subassembly 50. Two actuating terminals 28R, 28L cooperated with the two circular pillars 15R, 15L on the two actuating rods respectively are extended from the actuating block. In addition, for each actuating rod, a second retaining spring 24R, 24L is provided between the central control seat and the actuating rod. The actuating block 27 is further provided with a first connection point 23 for fixing a transmission wirerope 29.

Referring to FIG. 2, before the synchronously controlling device is actuated, the transmission rods 12R,12L provided on the transmission fixing seat fixed to the cranks 1R,1L are retained at a predetermined position relative to the cranks through the first retaining springs 13R,13L. The controlling rings 30R,30L fixed to the actuating rods 14R,14L are retained at the predetermined position of the central control seat 25 through the second retaining springs 24R,24L. With the first retaining springs and the second retaining springs, when the entire device is not actuated, the transmission protrusions 31R,31L of the transmission rods keep in an untouched state relative to the controlling rings, thereby, when the bicycle is ridden, i.e., when the cranks rotate relative to the bottom bracket tube, frictions will not be produced between the transmission rods 12R,12L and the controlling rings 30R,30L.

When the actuating block 27 on the central control seat is driven to spin, the actuating terminals 28R,28L of the actuating block push the circular pillars 15R,15L arranged at the ends of the actuating rods, which overcomes the effort between the actuating rods and the second retaining springs 24R,24L of the central control seat, so that the two actuating rods move in opposite directions, the two controlling rings 30R,30L fixed with the actuating rods successively move in opposite directions, so that the two controlling rings push the transmission protrusions 31R,31L of the transmission rods at the two cranks located at the two sides of the bottom bracket tube 20 to move the transmission rods 12R,12L. Therefore, a source of power via the actuating block 27 is further transmitted to the transmission rods at the two cranks through the two controlling rings 30R,30L.

The actuating process is reverted by freeing the rotating force of the actuating block 27, and through the first retaining springs and the second retaining springs, the entire device is reverted to a state not be braked formerly.

During the braking process, the two controlling rings 30R, 30L move axially along the bottom bracket tube 20, and no relative rotation between the two rings occurs. The two controlling rings can be moved coaxially in a same direction, however, the two controlling rings moved coaxially in a reverse direction in this embodiment is preferable.

Referring to FIG. 1, the bottom bracket tube is fixed with a first tube 23 connected to a second tube 21 capable of being folded, wherein the first tube 23 is fixed with the bottom bracket tube 20, the second tube 21 can be folded relative to the first tube 23, that is the second tube 21 can be freely rotated relative to the bottom bracket tube 20 within some limits, the second tube is provided with a second connection point 22 for fixing with the transmission wirerope 29.

When one end of the transmission wirerope 29 is fixed with the second connection point 22 of the second tube and the other end with the first connection point 27a of the actuating block located at the central control seat, the transmission wirerope 29 fixed to the second tube drives the actuating block 27 at the central control seat to rotate by folding the second tube 21, which drives the two actuating rods 14R,14L to move, so that the controlling rings 30R,30L fixed with the two actuating rods drive the transmission rods 12R,12L arranged at the ends of the two cranks 1R,1L.

When the first tube 23 is fixed with the bicycle front frame, the second tube 21 can be a part of the seat tube, or a part of the bicycle rear frame; when the first tube 23 is fixed with the bicycle rear frame, the second tube 21 can be a part of the seat tube or a part of the bicycle front frame.

Therefore, a source of power from bending the second tube 21 of the bicycle is conveyed axially along the bottom bracket tube 20 of the bicycle via the two controlling rings 30R,30L, which in turn makes a source of power of the second tube 21 to be conveyed to the controlled apparatuses located at the ends of the two cranks 1R,1L at two sides of the bottom bracket tube 20.

The controlled apparatuses can be foldable pedals, detachable pedals or foldable cranks. Its purpose is to minimize the width of a bicycle so as to achieve a smaller size.

In this way, the width and the size of a bicycle can be automatically reduced by folding the second tube 21 of a bicycle.

Figure 3:
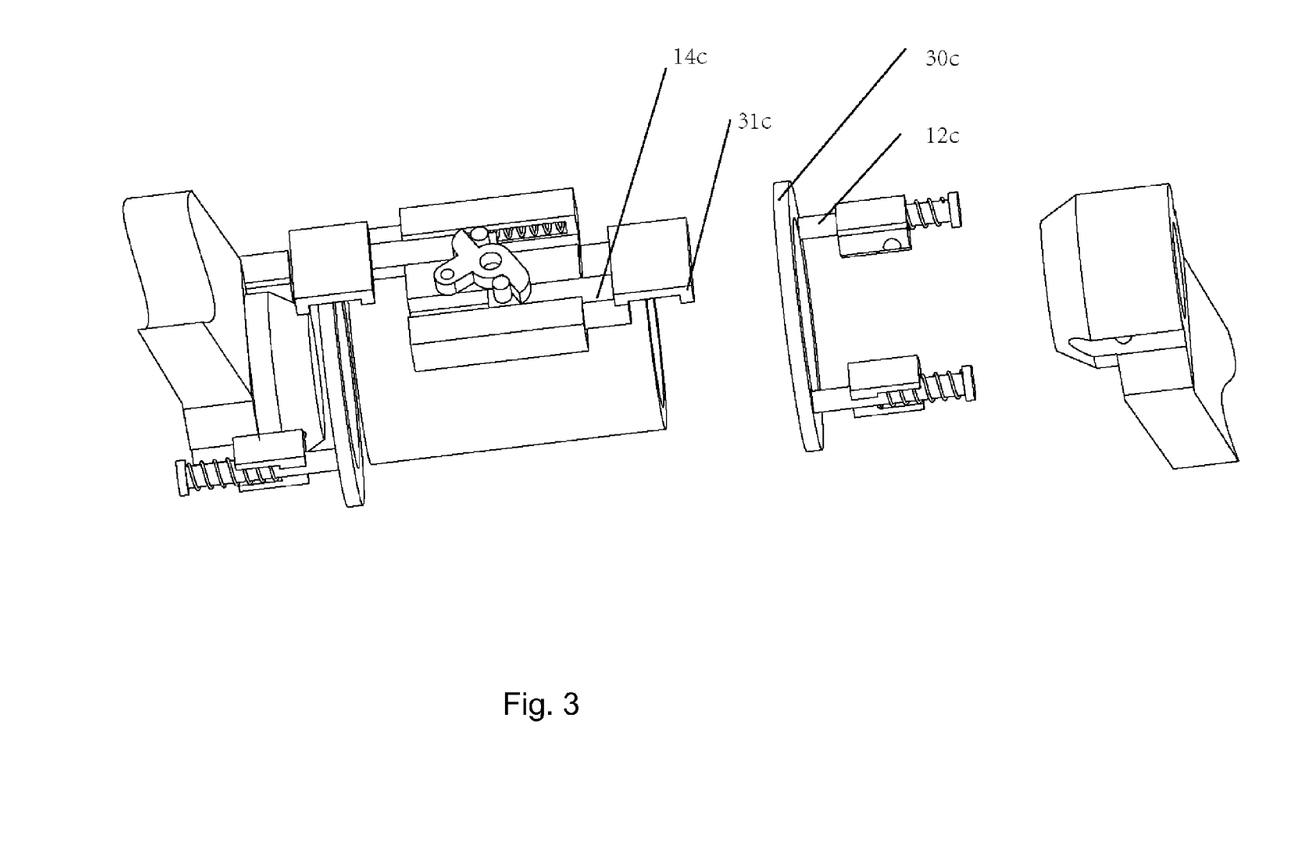
FIG. 3 is a schematic view showing another example according to the first embodiment of the present application.

Moreover, with referring to FIG. 3, a protrusion 31c engaged with a controlling ring 30c is extended from one end of an actuating rod 14c, and a transmission rod 12c at the crank is fixed with the controlling ring 30c, which achieves an object of the present application.

Second Embodiment

Figure 4:
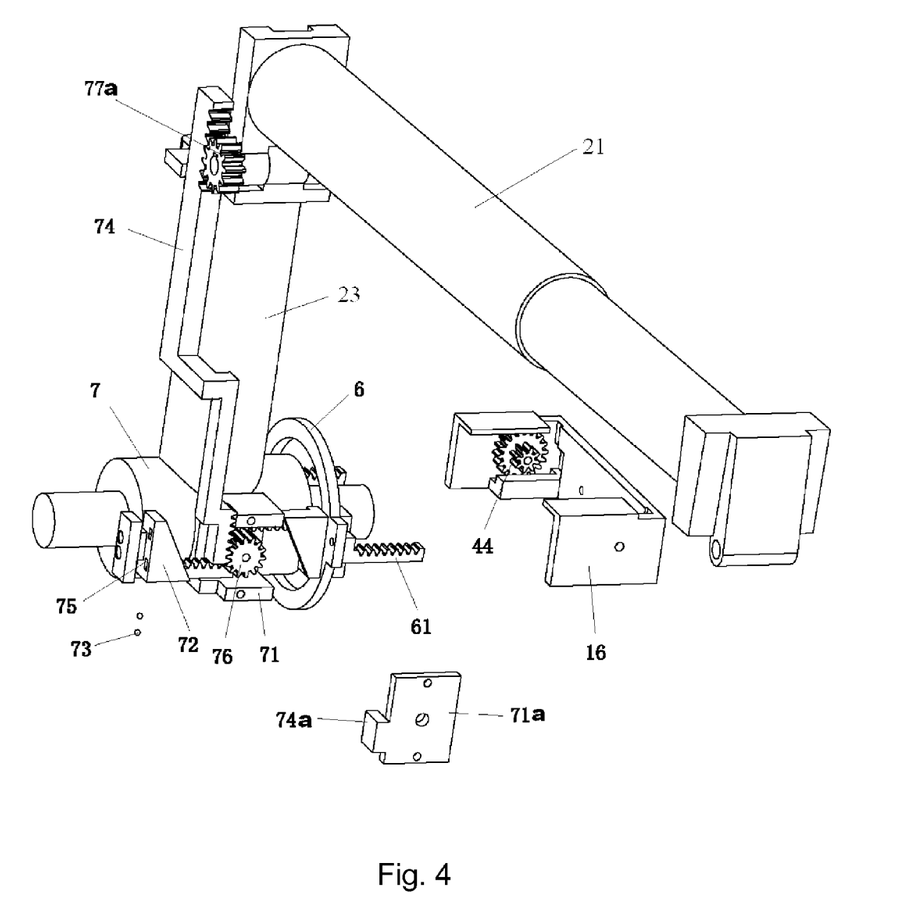
FIG. 4 is a partial perspective exploded view according to a second embodiment of the present application.

Referring to FIG. 4, a central control seat 71 is fixed on a bottom bracket tube 7 of a bicycle. A central control enclosure 71a is fixed on the central control seat. An edge 74a formed on the central control enclosure 71a serves as a sliding guide of an actuating rack 74. A gear 76 as the driving element is fixed to the central control seat 71 and engages with the actuating rack 74 as well as two pushing racks 72. The two pushing racks 72 are provided, at one end, with a groove 75 for accommodating two controlling rings 6. The groove 75 is provided with ball bearings 73 on a face contacted with the two controlling rings 6 for reducing friction force therebetween. The inner of each controlling ring is a ring-like structure, such that the controlling ring can have an angle-equal contact with the groove 75 of the pushing rack 72 when the cranks rotate.

A rack 61 restricted by a transmission fixing base 16 at an end of a crank causes the controlling ring 6 can be freely move relative to the axis of the bottom bracket tube within some limits. Meanwhile, there is no relative rotation between the cranks at two sides of the bicycle, therefore, by fixing with the rack 61 and directional moving in a predetermined direction at the transmission fixing base 16 on the end of the crank, there is no relative rotation between the two controlling rings.

In addition, the actuating rack 74 is engaged with a gear 77a which is fixed with the foldable position of the seat tube 21, 23 coaxially, as such, when the seat tube is bended, the gear 77a and the actuating rack 74 engaged with the gear 77a are driven, through the gear 76, the actuating rack 74 drives the two pushing rack 72 to drive the two controlling rings 6 to move along the direction parallel to the axis of the bottom bracket tube. In this way, the rack 61 fixed to the two controlling rings 6 drives a dual gear 44 which is arranged on the transmission fixing base 16 and engaged therewith, such that a transmission rack 43 conveys a source of power to the ends of the cranks. The transmission rack 43 is only used for transmitting and can be replaced by other transmission assembly. In another example, the controlling rings 6 can also be fixed to the pushing rack 72, the rack 61 engaged with the dual gear 44 is not fixed to the controlling rings 6 but forms a groove 75 at one end thereof for accommodating the controlling ring 6 like the pushing rack 72. Ball bearings are also provided inside the groove 75 for reducing friction force between the groove and the controlling ring 6, which can achieve the object of the present application as mentioned in the first embodiment.

Third Embodiment

Figure 5:
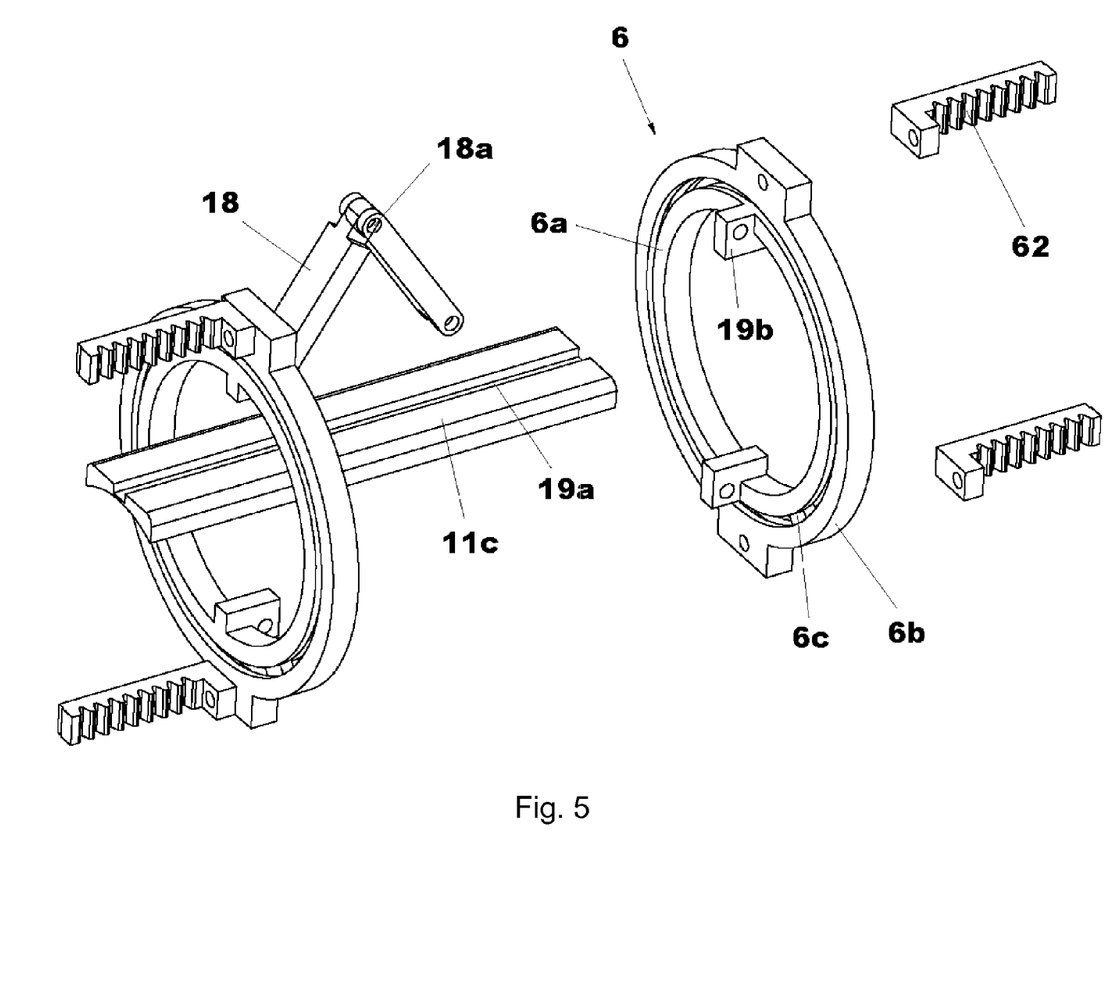
FIG. 5 is a schematic view showing a controlling ring according to a third embodiment of the present application.
Figure 6:
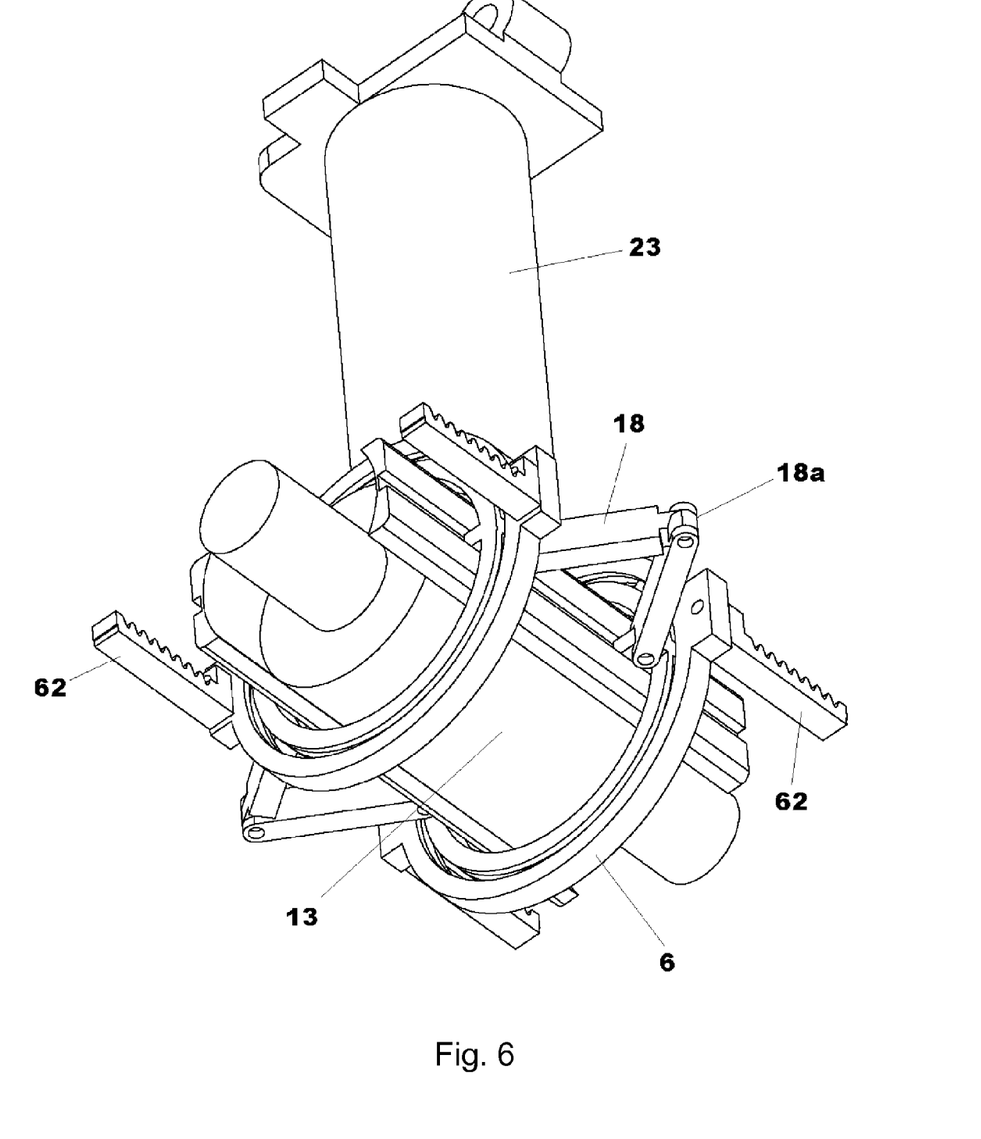
FIG. 6 is a schematic view showing a synchronously controlling structure according to the third embodiment of the present application.

Referring to FIG. 5 and FIG. 6, an exterior ring 6b is provided. An annular concave is formed on the inner side of the exterior ring 6b. Three supporting blocks 6c are fixed to an interior ring 6a having an inner diameter less than that of the exterior ring, and are arranged inside the annular concave of the exterior ring 6b. In this way the exterior ring and the interior ring can only be moved by way of relative rotation, and therefore together to form a controlling ring 6 capable of directional moving along the axis of the bottom bracket.

The actuating subassembly comprises two movable V-shaped rods 18, wherein the hinge 18a of the V-shaped rods is movable. Both ends of the two V-shaped rods are hinged to the interior ring 6a of the controlling ring 6 respectively. A transmission rack 62, fixed on the exterior ring, drives the transmission fixing base at the ends of the cranks as shown in the first embodiment, and is restricted to move along the axis of the bottom bracket tube. Moreover, a central control seat 11c is fixed on the bottom bracket tube 13, wherein the central control seat 11c is provided with a guide rail 19a on which the controlling ring moves, a sliding guide block 19b corresponding to the guide rail is fixed on the interior ring of the controlling ring. Through toggling the hinge 18a of the V-shaped rods, the V-shaped rods drive the two control rings to move directionally along the axis of the bottom bracket, such that the power receiving subassembly of the two cranks at two sides of the bottom bracket is driven by the transmission subassembly.

Other embodiments can be reduced by referencing the solution mentioned in the first embodiment.

All the above are only the preferred examples of the present invention, and do not limit the present invention. Any amendment, equivalent replacement, improvement, etc. within the spirit and principle of the present invention should fall within the extent of protection of the present invention.

The invention claimed is:

1. A synchronously controlling device for a bicycle, comprising:
   a bottom bracket tube having a first side, a second side and an axis;
   a first crank arranged at the first side of the bottom bracket tube;
   a second crank arranged at the second side of the bottom bracket tube;
   an actuating subassembly comprising a first side, a second side, a central control seat, a driving element, a first actuating rod and a second actuating rod, wherein the central control seat is fixed to the bottom bracket tube, wherein the driving element drives the actuating rods to move, wherein the first and second actuating rods are capable of moving axially along the bottom bracket tube, wherein the actuating subassembly is arranged at the bottom bracket tube;
   a first transmission subassembly comprises a first transmission fixing seat and a first transmission rod, wherein the first transmission fixing seat is fixed on the first crank, and wherein the first transmission rod is capable of moving axially along the bottom bracket tube, wherein the first transmission subassembly is arranged at the first side of the actuating subassembly;
   a second transmission subassembly comprises a second transmission fixing seat and a second transmission rod, wherein the second transmission fixing seat is fixed on the second crank, and wherein the second transmission rod is capable of moving axially along the bottom bracket tube, wherein the second transmission subassembly is arranged at the second side of the actuating subassembly; and
   a first controlling ring arranged between the actuating subassembly and the first transmission subassembly to rotationally connect the actuating subassembly and the first transmission subassembly, wherein the first controlling ring is fixedly connected to an end of the first transmission rod, or the first controlling ring is fixedly connected to an end of the first actuating rod, such that a driving action of the actuating subassembly is conveyed via the first transmission rod at the end of the first crank through the first controlling ring;
   a second controlling ring arranged between the actuating subassembly and the second transmission subassembly to rotationally connect the actuating subassembly and the second transmission subassembly, wherein the second controlling ring is fixedly connected to an end of the second transmission rod, or the second controlling ring is fixedly connected to an end of the second actuating rod, such that the driving action of the actuating subassembly is conveyed via the second transmission rod at the end of the second crank through the second controlling ring;
   wherein a trajectory of the first and second controlling rings is parallel to the axis of the bottom bracket tube;

wherein the first transmission subassembly is arranged on the first crank and is capable of rotating relative to the actuating subassembly;

wherein the second transmission subassembly is arranged on the second crank and is capable of rotating relative to the actuating subassembly;

wherein the driving action of the actuating subassembly is output synchronously from the first and second transmission subassemblies through the first and second controlling rings;

wherein the first transmission subassembly further comprises a first retaining spring, wherein the first retaining spring is arranged between the first transmission fixing seat and the first transmission rod to retain the first transmission rod at a predetermined position relative to the first crank;

wherein the second transmission subassembly further comprises another first retaining spring, wherein the another first retaining spring is arranged between the second transmission fixing seat and the second transmission rod to retain the second transmission rod at a predetermined position relative to the second crank; and wherein the actuating subassembly further comprises two second springs, wherein one of the two second springs is arranged between the first actuating rod and the central control seat to retain the first controlling ring at a predetermined position relative to the central control seat, and another one of the two second springs is arranged between the second actuating rod and the central control seat to retain the second controlling ring at a predetermined position relative to the central control seat.

2. A synchronously controlling device for a bicycle, comprising:

a bottom bracket tube having a first side, a second side and an axis;

a first crank arranged at the first side of the bottom bracket tube;

a second crank arranged at the second side of the bottom bracket tube;

an actuating subassembly comprises a first side, a second side, a central control seat, a driving element, a first actuating rod and a second actuating rod, wherein the central control seat is fixed to the bottom bracket tube, wherein the driving element drives the actuating rods to move, wherein the first and second actuating rods are capable of moving axially along the bottom bracket tube; wherein the actuating subassembly is arranged at the bottom bracket tube;

a first transmission subassembly comprises a first transmission fixing seat and a first transmission rod, wherein the first transmission fixing seat is fixed on the first crank, and wherein the first transmission rod is capable of moving axially along the bottom bracket tube, wherein the first transmission subassembly is arranged at the first side of the actuating subassembly;

a second transmission subassembly comprises a second transmission fixing seat and a second transmission rod, wherein the second transmission fixing seat is fixed on the second crank, and wherein the second transmission rod is capable of moving axially along the bottom bracket tube, wherein the second transmission subassembly is arranged at the second side of the actuating subassembly; and a first controlling ring arranged between the actuating subassembly and the first transmission subassembly to rotationally connect the actuating subassembly and the first transmission subassembly, wherein the first controlling ring is fixedly connected to an end of the first transmission rod, or the first controlling ring is fixedly connected to an end of the first actuating rod, such that a driving action of the actuating subassembly is conveyed via the first transmission rod at the end of the first crank through the first controlling ring;

a second controlling ring arranged between the actuating subassembly and the second transmission subassembly to rotationally connect the actuating subassembly and the second transmission subassembly, wherein the second controlling ring is fixedly connected to an end of the second transmission rod, or the second controlling ring is fixedly connected to an end of the second actuating rod, such that the driving action of the actuating subassembly is conveyed via the second transmission rod at the end of the second crank through the second controlling ring;

a first tube and a second tube, wherein the first tube is fixed with the bottom bracket tube, wherein the second tube is able to be folded relative to the first tube;

wherein the second tube is connected with the driving element via a transmission element; and wherein the driving element of the actuating subassembly is operated by the actuating force generated during the second tube being folded to drive the actuating subassembly;

wherein a trajectory of the first and second controlling rings is parallel to the axis of the bottom bracket tube, wherein the first transmission subassembly is arranged on the first crank and is capable of rotating relative to the actuating subassembly, wherein the second transmission subassembly is arranged on the second crank and is capable of rotating relative to the actuating subassembly, wherein the driving action of the actuating subassembly is output synchronously from the first and second transmission subassemblies through the first and second controlling rings.

3. The synchronously controlling device according to claim 2, wherein the driving element is formed as an actuating block, wherein the transmission element is formed as a transmission wirerope, wherein a second connection point of the second tube is connected with a first connection point of the actuating block via the transmission wirerope.

* * * * *